Dec. 5, 1967   P. U. PUTSCH   3,356,415
ADJUSTABLE BACKREST MECHANISM
Filed July 14, 1966   4 Sheets-Sheet 4
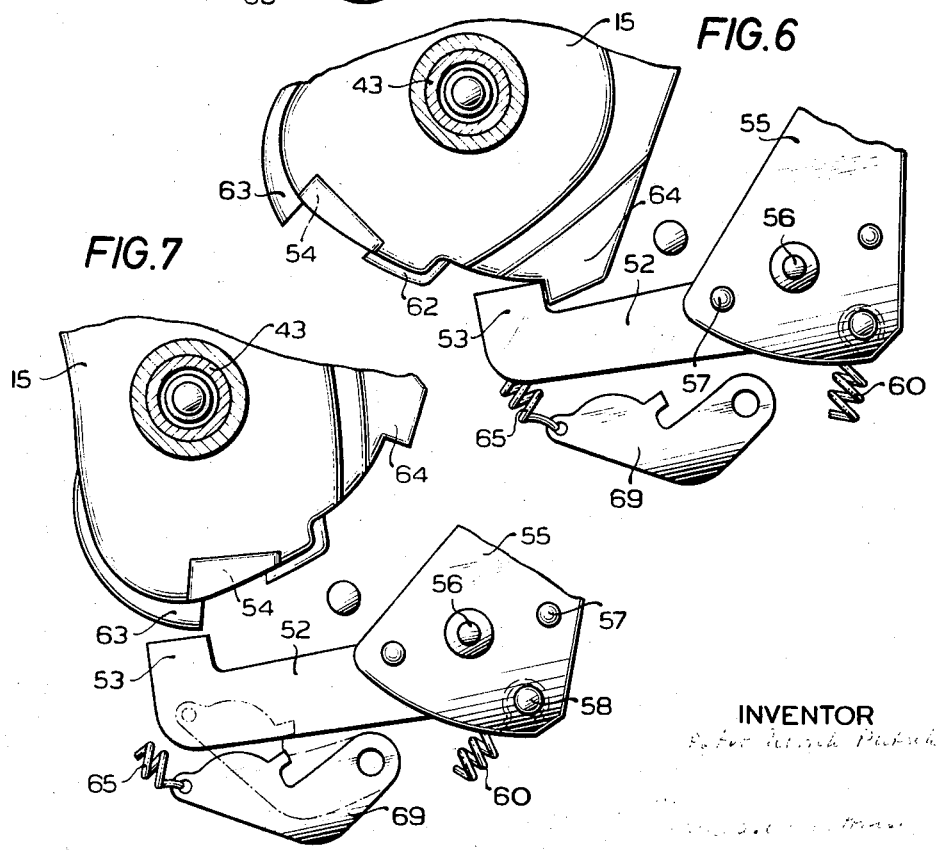
INVENTOR

United States Patent Office 3,356,415
Patented Dec. 5, 1967

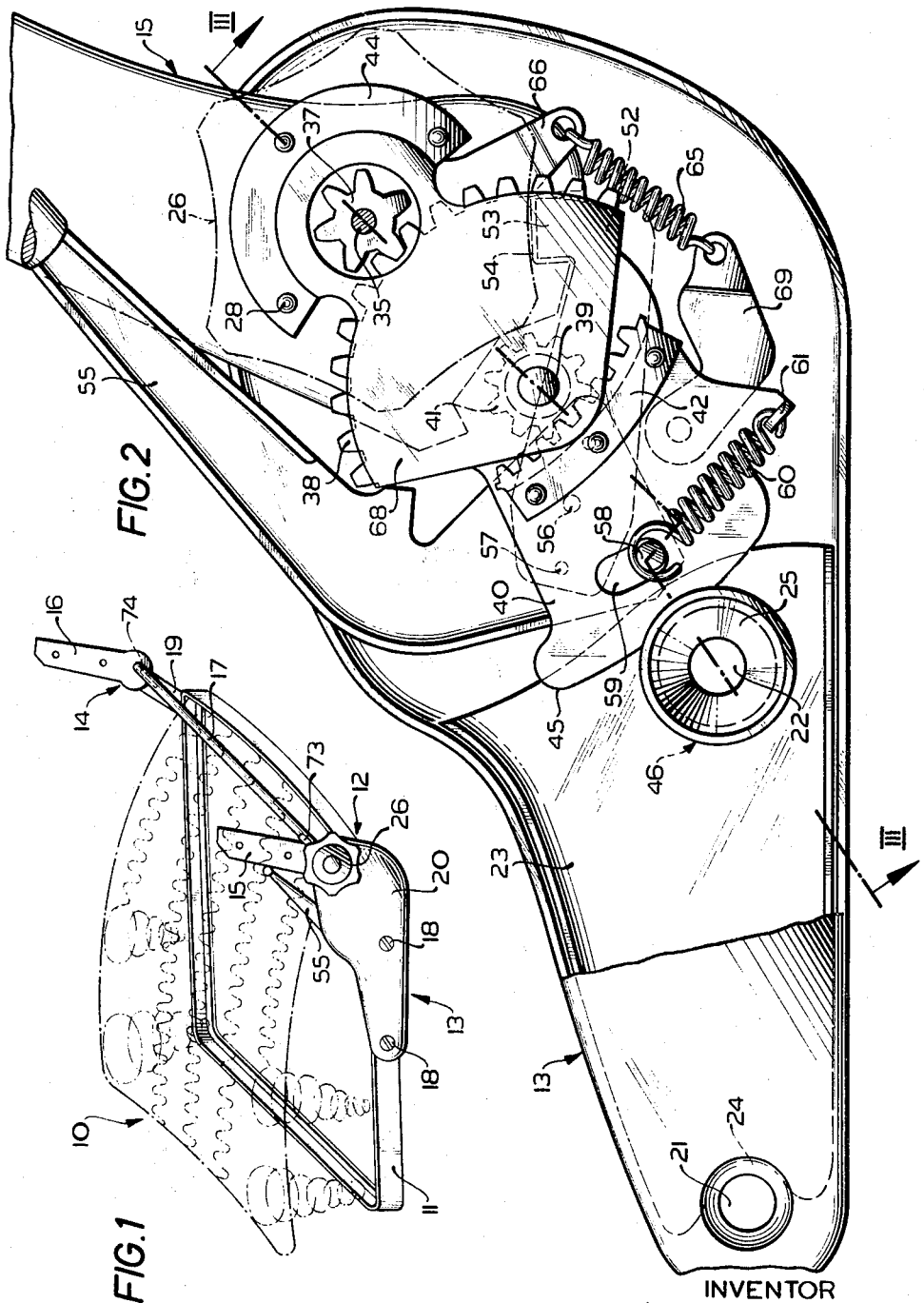

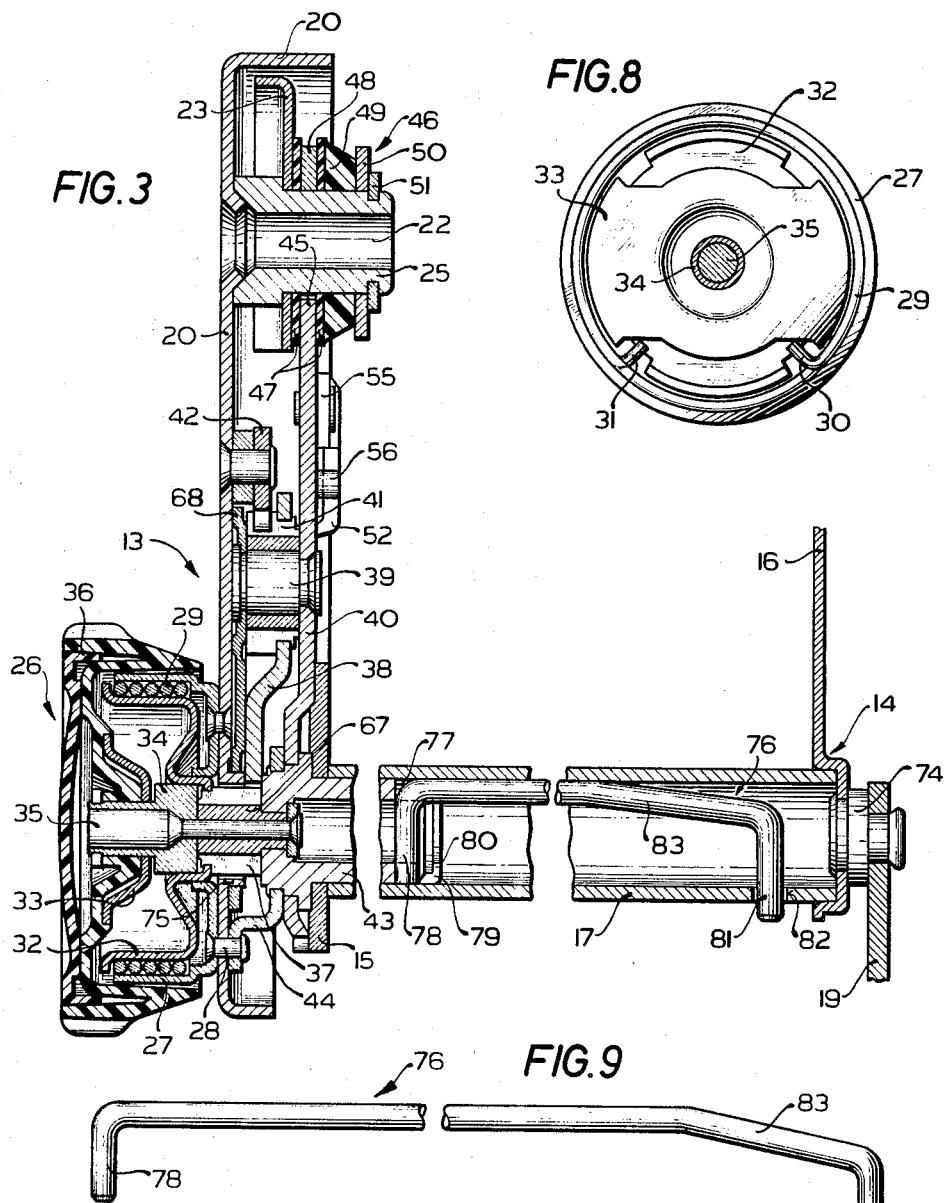

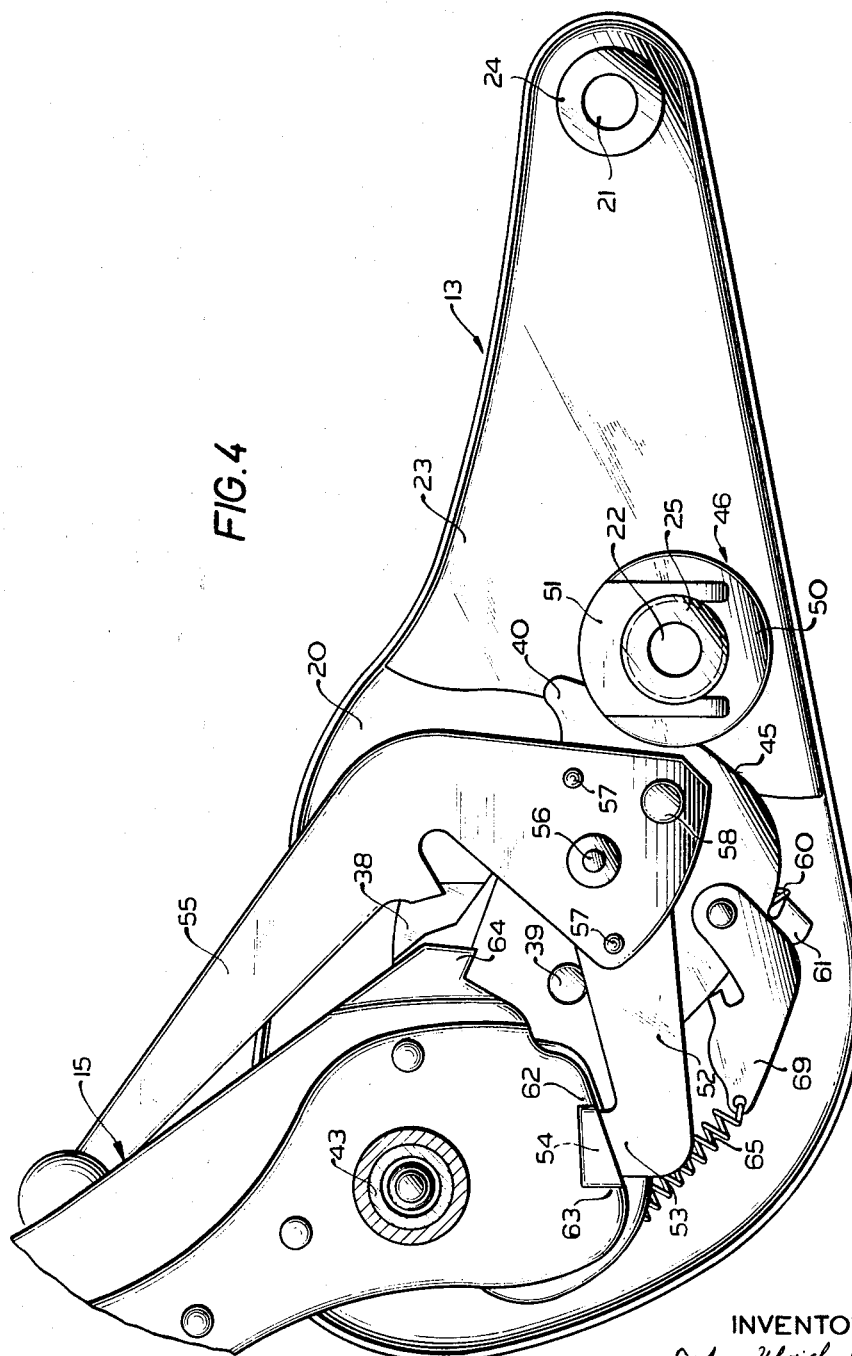

3,356,415
ADJUSTABLE BACKREST MECHANISM
Peter Ulrich Putsch, Remscheid-Hasten, Germany, assignor to Fritz Keiper, Remscheid-Hasten, Germany
Filed July 14, 1966, Ser. No. 565,120
Claims priority, application Germany, July 17, 1965, K 56,643
10 Claims. (Cl. 297—379)

ABSTRACT OF THE DISCLOSURE

A motor vehicle seat in which a seat back having a frame including a tubular cross member is pivotally mounted on the seat portion of the seat by pivot means including a hinge fitting with adjusting and releasable locking means on one side of the seat portion of a simple pivot bearing on the other side thereof, and in which a loading spring is located in the tubular cross member constructed and arranged to bias the cross member in one direction about the axis of the pivot means and to releasably connect the cross member to said hinge fitting.

The invention relates to a seat, particularly a motor vehicle seat with an adjustable back, in which the back is connected to the seat on one side thereof by an articulated mount (i.e. a hinge fitting) provided with an adjusting and locking arrangement and, on the other side thereof, by a simple pivot bearing, the back of the seat having a supporting frame consisting of at least two upright members spaced from one another and joined by a cross member which extends between the hinge fitting and the pivot bearing.

Seats as specified in the preceding paragraph have in themselves considerable advantages. For example, any existing rotary and bearing pivots of the articulated mount part or of the simple pivot bearing are so constructed that they can exercise an additional function, namely that of each directly accommodating one end of the aforesaid cross member. By reason of this, not only can additional connecting points between the cross member and the upright members of the support frame of the seat back be avoided, but there is also an improved absorption of the forces to which the seat back is subjected, because these are namely introduced directly into the bearings of the articulated mount or pivot bearing. In one proposed embodiment of such a seat, the adjusting and locking means consists of a combination of a fine adjusting arrangement and a freely pivoting arrangement. The freely pivoting arrangement has in the past been so constructed that the seat back can pivot freely in both directions from any preselected seat back setting, i.e. the free pivoting arrangement can on the one hand be used to move the seat forwards, in other words towards the instrument panel of the vehicle, the so-called position for climbing-in the vehicle and, on the other, the free pivoting arrangement enables the seat back to be moved rearwardly through the selected seat position until, in the extreme position, the seat is said to be reclining. The fine adjusting arrangement can be infinitely varied within a very wide range of angles. The preselected and adjusted bearings of the seat back within the range of the fine adjustment can, after the free pivoting arrangement has first been used—and independently of the direction of movement—be restored automatically or, in other terms, the seat back will always return to the preset starting position. In a seat as described above, particularly a motor vehicle seat, it is necessary to carry out a manual operation in the region of the free pivot arrangement, independently of the direction of movement. This means that, independently of the direction of pivoting, the user had to adjust the seat back manually in the region of the free pivoting arrangement. It is an aim of the invention to improve such seats.

According to the invention, we provide a seat having a seat portion and an adjustable back, in which the seat back is connected to the seat portion on one side by a hinge fitting having an axis about which the seat back can pivot and having an adjusting and locking arrangement, and on the other side by a simple pivot bearing, the seat back having a support frame consisting of at least two upright members spaced from one another and joined by a cross member which extends between the hinge fitting and the pivot bearing, in which the cross member is hollow and has disposed therein a loading spring for the seat back.

By virtue of the construction of a seat herein disclosed, functions which hitherto had to be performed manually are now assumed by the spring located inside the hollow cross member. As regards the direction in which the forces of the spring act on the seat back, several possibilities arise. A preferred construction and arrangement of the spring is where the seat back is moved by the spring from the sitting or normal position into the climb-in position or where the seat back is moved from the reclining position into the sitting or normal position. This arrangement and construction of the spring which loads the seat back has above all the great advantage that, after the locking device has been released, the seat back automatically moves into the climbing-in position and remains therein until the persons have climbed into the vehicle. By reason of the manual pivoting, the seat back can then be restored from the climbing-in position to the sitting or normal position and, to repeat it once again, the seat back will always return to the starting position to which it has been set. On the other hand, it would be entirely conceivable, in special cases, to reverse the direction of the spring forces so that they act on the seat back in a different manner. As a rule, however, preference is given to the first embodiment.

According to a further proposal of the invention, the loading spring is at the same time used to secure the articulated mount against being pulled out from the cross member. This means that the loading spring has to fulfill two functions; namely, on the one hand it is to load the seat back in the manner indicated and, on the other, it is intended to prevent the articulated mount being unintentionally withdrawn from the cross member. Thus, a maximum of effect is achieved with the minimum of means.

It is recommended that one end of the spring be secured to the bearing pivot of the articulated mount and the other, opposite end, to the cross member. It is expedient for one angled end of the spring to engage in slots in the bearing pivot and to be protected there against being withdrawn, by a retaining device. This retaining device can take the form of a washer which is in turn secured in position by flanges on the bearing pivot. The other, opposite end of the loading spring, which is likewise angled, passes through an aperture in the cross member.

According to a further proposal of the invention, the zone immediately following this end of the loading spring is inclined in respect of the other parts of the loading spring and is also inclined in respect of the inner wall of the cross member. This construction is utilised in order to permit of easy insertion and, if necessary, removal of the free end of the loading spring from the aperture in the cross member. By reason of the inclined portion, when the component parts are in their assembled position, a gap is namely left between this portion and the inner wall of the cross member, so that it is possible for the said portion to be bent back. By means of such bending back, the free, angled end of the loading spring can pass out of the aperture and into the interior of the cross member, so that a free withdrawal of the articulated mount, with the loading spring, is subsequently possible.

With regard to the construction and form of the loading spring itself, various possibilities arise. According to a first proposal of the invention, the loading spring is constructed as a substantially rectilinear spring member which does however incorporate the aforesaid inclined portion. The cross-section of such a spring is expediently circular. According to a second proposal of the invention, however, a hairpin-shaped bading spring may be used. And, finally, it is also possible to use a coiled spring. It goes without saying that one and the same cross member could also have several loading springs associated with it and that the said springs may be of the same or dissimilar construction. In this way, it is possible to adapt the forces which are to act on the seat back to the particular circumstances.

An exemplary embodiment of the invention is illustrated in the accompanying drawings, in which:

FIG. 1 is a diagrammatic representation of a motor vehicle seat constructed according to the invention, having a sprung frame;

FIG. 2 shows, on an enlarged scale and with part broken away, an adjusting means for the articulated mount according to FIG. 1, seen from outside the motor vehicle seat;

FIG. 3 is a cross-section through the complete adjusting arrangement;

FIG. 4 is a side view, with part broken away, showing the adjusting arrangement of the articulated mount according to the invention, seen from the side which is towards the interior of the seat;

FIGS. 5–7 show different positions of a ratchet lock for the adjusting arrangement;

FIG. 8 is a plan view of the actuating knob of the articulated mount with the grip removed; and FIG. 9 is a view of a loading spring.

In the case of the articulated mounts shown, these, as can be seen from FIG. 1, are mounts intended to be used in conjunction with motor vehicle seats or the like and which are intended to permit the seat back to be adjusted to different positions. Of the seat itself, only the spring frame 10 and seat frame 11 are shown. The back or parts thereof are not included, for the sake of simplicity. It should however be mentioned that the seat back has a support frame which is reinforced by cross members. It is possible for the support frame to be shaped as a U open at one end. In this case, the support frame consists of two upright members which are joined by one cross member.

The motor vehicle seat has only on one of its sides an articulated mount of a construction which is as yet to be described, having on the other side only a simple pivot bearing.

The articulated mount is generally designated by the reference numeral 12 and is also referred to herein as a hinge fitting. It consists essentially of the two differently shaped mount parts 13 and 15. Engaging around the bearing pivots 43 (FIGS. 3 and 4) of both mount parts 13, 15 is a cross member 17 which—see FIG. 1—extends to the other, opposite side of the seat and is secured there by a bearing pivot 74 of the pivot bearing 14. The cross member 17 is hollow, so that the bearing pivots 43, 74 can engage into the tubular apertures from different directions.

Furthermore, the hollow cross member 17 accommodates a loading spring 76 for the seat back, as will be referred to hereinafter.

Considered from the sitting position of the driver or the like, the articulated mount 12 is disposed on the left-hand side of the vehicle seat and exhibits an adjusting and locking arrangement which will be described in greater detail hereinafter. On the right-hand side of the motor vehicle seat is an ordinary pivot bearing 14 which consists of only two arms 16, 19 which are simply pivoted together without any adjusting or locking arrangement.

The part 15 of the articulated mount 12 and an arm 16 connected to the pivot bearing 14 cooperates with the seat back, not shown, and are essentially of the same construction as each other. They are provided with apertures, which need not be described in greater detail but which serve for attachment to the seat back or for marking purposes, namely where the seat back is connected to these parts in a different manner, for example by welding.

A second arm 19 connected to the pivot bearing 14 is secured at one end on the frame 11, for example by welding, and carries at the other end the aforesaid bearing pivot 74 which extends coaxially with the cross member 17. As already mentioned, the embodiment described provides for the cross member 17 to be tubular, passing through the arm 16 and then cooperating with the aforesaid bearing pivot of the arm 19. It can be seen that, by this arrangement, the arm 16 is able to pivot about the longitudinal axis of the cross member 17. The arm 16 is thereby rigidly connected to the cross member 17. The mount part 15 on the other side is positively connected to the cross member 17. The cross member 17 engages through the mount part 15 and then cooperates with the bearing pivot 43 which forms a part of the locking arrangement, the construction of which will be described in detail hereinafter. It can be seen that the cross member 17 connects the two parts 15 and 16 with each other. The cross member 17 can also be constructed as a torsion tube.

As can be seen from FIG. 1, that mount part 13 of the articulated mount 12 which accommodates the locking and adjusting arrangement is connected to the seat frame 11. For this purpose, the part 13, as is shown particularly in FIGS. 2–4, has apertures 21 and 22 through which pass bolts 18. These are secured in threaded holes in the seat frame 11 or may be secured by nuts. The exact arrangement and configuration of the apertures 21, 22 will be described in detail hereinafter within the description of the mount part 13.

The mount part 13 contains the entire locking and adjusting arrangement which represents the combination of a fine adjusting arrangement with a free-pivoting arrangement. The free-pivoting arrangement is so designed that the seat back can pivot in both directions from any preselected seat back setting, i.e. the free-pivoting arrangement can on the one hand be used to move the seat forwardly, in other words in the direction of the instrument panel of the vehicle, which position is herein referred to as the climbing-in position; on the other hand, the free-pivoting arrangement makes it possible to move the seat back rearwardly beyond the chosen sitting position until the reclined position is finally reached. The fine adjusting arrangement can be infinitely varied within a very wide range of angles. The pre-selected and adjusted position of the seat back within the range of fine adjustment can be automatically restored after use of the free-pivoting arrangement—and in fact independently of the direction of movement—or, in other words, the seat back will always return automatically to the starting position to which it has been adjusted.

Associated with the mount part 13 is a shell-shaped housing 20, the form of which is shown particularly in FIGS. 2 and 4. The shell 20 has essentially the shape of an elongated triangle provided with markedly rounded corners and a raised edge, as can be seen particularly in FIG. 3. Essentially, the edge of the shell 20 is the same height all round, the height of the edge being only reduced in the region of a hand lever 55 which protrudes laterally from the shell.

The shell 20 is also used to connect the mount part 13 to the seat frame 11. To make this possible, the aforesaid apertures 21 and 22 are provided in the region of a reinforcing plate 23, this arrangement advantageously enhancing the stability. The aperture 21 is at the forward tip of the triangular shell 20. The aperture 21 is enclosed by a sleeve 24 which extends from the inside of the shell 20 and which is of a length such that its free end face bears on the seat frame 11. In this way, the shell 20 and, with it, the adjusting arrangement which it accommodates, is kept at a certain interval from the seat frame 11. As can be seen from FIG. 2, the sleeve 24 has in it a circular groove into which the bifurcated end of the reinforcing plate 23 engages. For further attachment, the sleeve 24 is welded both to the reinforcing plate 23 and to the shell 20. As already mentioned, the mount part 13 has a further aperture 22 so that it may be connected to the seat frame 11 through a further bolt 18. Also, the aperture 22 has, following it, a sleeve 25 which serves various purposes which will be described hereinafter in detail.

If it is desired to adjust the seat back within the aforesaid range of fine adjustment, it is necessary to rotate an actuating knob generally designated 26. Inside the actuating knob 26 is a unilaterally self-locking coupling. So long as a force is being applied by the adjusting arrangement or by the seat back, the coupling remains self-locked. On the other hand, if a force is applied from the grip 36 of the actuating knob 26, the self-locking action of the coupling is removed. In the first phase of movement of the grip 36, the self-locking action of the coupling is merely removed. It is not until after this has happened that the fine adjustment arrangement moves further and the seat back is changed to a different position. This occurs with a stepless movement. As will be indicated hereinafter, the coupling can be released by actuation of the grip 36 in both directions of rotation. Also, the seat back can be finely adjusted both forwardly and rearwardly—naturally within the scope of the limits provided. The self-locking coupling consists of a brake bush 27 which is secured to the shell 20 by rivets 28, 28'. While the rivets 28 serve exclusively to secure the brake bush 27, rivets 28' serve additionally to connect to the shell 20 parts of the adjusting arrangement which are still to be described in detail. A multiple-coil spring 29, the ends 30 and 31 of which are bent inwardly as hooks (see FIG. 8) bears against the inner wall of the brake bush 27. These ends 30 and 31 cooperate with coupling parts 32, 33. The coupling part 32 is indirectly, that is to say through a bearing sleeve 34, nonrotatably secured on a pin member 35 which serves as a spindle. The coupling part 33, on the other hand, is freely rotatably mounted on the aforesaid pin member 35 but is nonrotatably connected to the aforesaid grip 36. The coupling parts 32 and 33 have dogs which it is not intended to describe in greater detail. These are in each case two diametrically opposed dogs which are disposed on a generated surface of a projected cylindrical member. As shown in FIG. 8, the dogs are only of a width such that a relatively large air gap, which it is not intended to describe in greater detail, is formed in each case on both sides of the dogs of the opposite coupling part 32 or 33. The self-locking action is achieved in that the coil springs 29 bear with a certain initial tension against the inside wall of the brake bush 27. Both ends 30 and 31 of the coil spring 29 act as locking projections against one of the two dogs of the coupling part 32. The coupling part 32, as already described, is namely nonrotatably connected to the pin member 35, the force flux from which—as will be described hereinafter—passing from the seat back through the adjusting arrangement to the coupling. One dog of the coupling part 32 is now in the region between the two ends of the coil spring 29 so that, regardless of the direction from which the coupling part 32 is stressed, the coil spring 29 is always biased towards being opened. Therefore, the self-locking action of the coupling is retained in any event or may be enhanced by the pressure arising. If, on the other hand, the grip 36 is actuated, then one side of one or other of the dogs of the coupling part 33, according to the direction of rotation, will bear against one of the two ends 30 and 31 of the coil spring 29. As the grip 36 is further rotated and, with it, the coupling part 33, the coil spring 29 is biased in the sense that it is twisted more tightly, so that a reduction in diameter occurs. The coils of the spring 29 moving away from the inside walls of the brake bush 27. This reduction in size is sufficient to disengage the coil spring 29 from the brake bush 27 so that, by means of the grip 26, free movement of the pin member 35 becomes possible.

All further parts apart from the aforedescribed coupling of the adjusting arrangement, are situated within the shell 20. The purpose of the pin member 35 is to convey the movement undertaken by the actuating knob 26 through the coupling into the inside of the shell 20. Inter alia, marginal parts of an aperture, not to be described in greater detail, through the shell 20 serve as bearings for a sleeve 34 in which the pin member 35 is nonrotatably accommodated. That end of the sleeve 34 which is away from the actuating knob 26 is provided with teeth. This part, which can be regarded as a gearwheel, is designated by the numeral 37. The gearwheel 37 engages with a toothed segment 38 which is held rotatably by a bearing 39 at its central point in relation to the toothed rim. For its part, the bearing 39 consists of a pin member secured at both ends in a rocker arm. The two rocker arms comprise a larger rocker arm 40 which has to perform functions which are as yet to be described, and a smaller rocker arm 68, the sole purpose of which is to hold the bearing pivot 39 securely. The two rocker arms 40 and 68 rotate about the same point. They are however held by different parts of the adjusting arrangement. The bearing for the smaller rocker arm 68 is an inwardly extending edge 75 of the shell 20. The rocker arm 40, on the other hand, is accommodated by a hollow journal 43 (bearing pivot). The hollow journal 43 engages in turn around parts of the bearing sleeve 67 and therefore also around the pin member 35. The last-mentioned parts are connected to one another rotatably so that the hollow journal 43 also serves as a bearing for the bearing sleeve 67 of the pin member 35. As an additional mounting, there is a basket 44 having an aperture, the marginal portions of which engage into a groove, which it is not intended to describe further, in the hollow journal 43. The bearing basket 44 itself is secured on the inner wall of the shell 20 by a plurality of rivets, namely by the aforesaid rivets 28'. Also essential to the adjusting arrangement in the fine adjustment range are a gearwheel 41 which is accommodated by the bearing pivot 39 which connects together the two rocker arms 40 and 68, as well as an arcuate toothed member 42 which is associated rigidly with the shell 20 by rivets which are not designated in greater detail. The arcuate toothed member 42 has an internal toothed portion which bears on an arc, the centre point of which is the pivot point of the two rocker arms 40, 68, namely the pin member 35. The gearwheel 41 is held rotatably by the bearing pivot 39, in actual fact situated between the two rocker arms 40 and 68.

The hitherto described parts of the adjusting arrangement constitute a first group of component parts of the adjusting arrangement, by which it is possible to carry out a fine adjustment of the seat back. As the actuating knob 26 is moved, the pin member 35 is moved in the same direction of rotation via the coupling, the action of which has already been described in detail. In turn, the pin member 35 entrains the bearing sleeve 67, which is nonrotatably connected to it, and thus the gearwheel-shaped part 37 thereof. The latter meshes with the toothed segment 38, so that this latter performs a rotary movement about its bearing, in other words about the pivot 39. The actual bearing for the toothed segment 38 is the gearwheel 41 which is carried directly by the bearing pivot 39. The toothed segment 38 and the gearwheel 41 are rigidly connected to each other. Therefore, the gearwheel 41 is compelled to perform the same angular movement as the toothed segment 38 receives from the gearwheel 37. Since on the other hand, the gearwheel 41 is in engagement with the arcuate toothed member 42, the gearwheel 41 rolls along the arcuate toothed member 42. As a function of this, so the rocker arms 40 and 68 perform an angular movement about their point of rotation, the pin member 35 or the associated bearing pivot 43. As will be described hereinafter in detail, this movement is then utilised in order to move the seat back within the range of fine adjustment.

So far, it has only been stated that the coupling already described in greater detail and accommodated in the actuating knob 26 also serves to absorb the forces arising from the seat back. Hereinafter, further means will be indicated which serve to accommodate these forces. In fact, the said means constitute a brake to which parts of the rocker arm 40 also belong. For this purpose, the rocker arm is arcuately shaped at its free end, the centre point of this arc coinciding with the pivot point of the rocker arm 40. The arcuate end of the rocker arm 40 is designated 45 and is clamped zonewise between the brake element, generally designated 46. This brake element 46 is composed of a plurality of disc-shaped members, all of which are disposed on the aforesaid bearing sleeve 25, being actually two discs 47 consisting of a plastic material, preferably a polyamide, which grip the free end 45 of the rocker arm zonewise between themselves. One of the two discs 47 has a side face bearing against the reinforcing plate 23. The disc 47 disposed on the other side of the rocker arm 40 is held by the bearing sleeve 25, after interposition of a spacer 48. The spacer 48 is not circular but has a segment cut away from one side. Into the free space thus formed engage parts of the rocker arm 40, so that the aforesaid clamping beween the two discs 47 can occur at that location. The spacer 48 is a little less thick than the rocker arm 40, so that the disc 47 can bear rigidly against the associated faces of the rocker arm 40. A flat application of the discs 47, made from a resilient material (polyamide) is thus achieved. In the embodiment shown, an application pressure is achieved, using a conically-shaped disc 49 made from a more highly resilient material than the discs 47. The conical disc 49 has one of its end faces applied against a metal disc 50 which, like all the other discs, is held by the bearing sleeve 25. The disc 50 is secured in place by a bifurcated clamp 51 which in turn has parts which engage in a circular groove in the bearing sleeve 25. The conical disc 49 is kept under pretension by the elements cooperating with it.

As has already been briefly mentioned, the rotary movement of the rocker arm 40 is utilised in order to move the mount part 15 for the seat back about its bearing, namely the hollow journal 43. In order to achieve this, the rocker arm 40 has associated with it a hook-shaped lever 52 which is pivotally mounted and which, as will be described hereinafter in detail, is biased by a traction spring. The loading direction of the lever 52 is so selected that its integral hook 53 engages in a recess 54, adapted to the hook shape, in the mount part 15. It should be stated that, when the rocker arm 40 performs one of the two reciprocating movements, the hook 53 of the lever 52 is entrained with it. The hook 53 moves the mount part 15 thereby in a manner which is still to be described. The cooperation of hook 53 and mount part 15 is encouraged by the mount part 15 being shaped as a double-armed lever. As already mentioned, its bearing is the hollow journal 43. In all positions in the range of fine adjustments, the hook 53 of the lever 52 remains in the recess 54 in the mount part 15. In the case of that embodiment of the invention on which the example is based, the range of fine adjustment is an angular span of approximately 26°.

In order to be able to move the back of the seat also into one of the two aforesaid free-pivot zones, it is necessary to disengage the hook 53 of the lever 52 from the mount part 15. To make this possible, a hand lever 55 is provided which has the same pivot point, namely a bearing 56, by means of which the lever 52 is secured on the rocker arm 40. In addition, the lever 52 is rigidly connected to the hand lever 55. In the embodiment illustrated, this is achieved by two rivets 57. As is shown particularly in FIG. 4, the hand lever 55 is of angled shape, the shorter arm of the angled hand lever serving for attachment to the lever 52. It can be seen that, by pivoting the free end of the hand lever 55 in an anticlockwise direction, the hook 53 of the lever 52 can be disengaged from the mount part 15. After being so disengaged, the seat back is free to pivot without difficulty.

The lever 52 is biased by a spring 60 which tends to draw the hook 53 into the recess 54. Certainly, the spring 60 does not directly engage the lever 52. Indeed, the hand lever 55 has, perpendicular to its face, a pin member 58, the free end of which engages through a slot 59 in the rocker arm 40. The free end of the spring 60, which is shaped as a coil spring, is secured at one end to the pin member 58 and at the other to an eyelet 61 which is integral with the rocker arm 40 and which is bent at right-angles to the basic plane of the rocker arm 40. The individual movement operations will now be described with reference to FIGS. 5–7. Initially, it will be assumed that the seat back is to be pivoted freely into the forward, in other words the climbing-in position. To make this possible, the hand lever 55 is pivoted against the action of the coil spring 60, the lever 52 performing a rotary movement in the same direction, namely anticlockwise. During this movement, the hook 53 of the lever 52 leaves the recess 54 in the mount part 15. In the first phase of the movement, a position is reached which is shown in FIG. 5. In consequence, the lever 52 comes to rest against a rocker 69 which is biased by a traction spring 65. The operator of the hand lever can then feel resistance. If the seat back is now only to be moved forwardly, in other words into the climbing-in position, then the resistance of the spring-loaded rocker 69 is not overcome. On the other hand, the amount which the lever 52 has by then travelled is sufficient for the mount part 15 to be pivoted clockwise. Because, as can be seen in FIG. 5, a relatively short projection 62 on the mount part 15 can pass below the hook 53 of the lever 52. The mount part 15 can only be pivoted until such time—as shown in FIG. 6—as a further projection 64 of the mount part 15 abuts against a side wall of the hook 53. As the seat is pivoted back, i.e. when the mount part 15 is moved anticlockwise, the rearward inclined contact surface of the projection 62 is overcome by the hook 53 due to the force made available by the spring 60. The backward pivoting movement can continue until the hook 53 and the recess 54 coincide. Subsequently, the hook 53 is drawn back into the recess 54 by its loading spring. This limit position corresponds to the preselected position in the fine adjustment range.

If, on the other hand, the back of the seat is to be moved into a rearward position, for example into the so-called reclined position, then it is necessary to pivot the hook 53 farther away from the mount part 15, sufficiently far for it to be able, as shown in FIG. 7, to pass under a relatively long projection 63 on the mount part 15. In order to move the hand lever 55 and, with it, the lever 52 so far, the already described position according to FIG. 5 must first be attained, in which the lever 52 abuts on the rocker 69. Now, however, pivoting of the lever 52 is not completed; it must continue moving further in the same direction, which it does against the resistance of the spring-loaded rocker 69. This is pivoted downwardly. This position is shown in FIG. 7. In this position of the lever 52 or of its hook 53, it is possible to pivot the mount part 15 and, with it, the seat back, in both directions, in other words also rearwardly. The hook 53 can pass by the longer projection. The pivoting movement to the rear is not restricted by a projection or the like; indeed, the seat back is moved until it is stopped by the back seat of the motor vehicle. From this reclined position, the seat back can again be pivoted forwards into the pre-selected sitting position by the loading spring 76, still to be described in detail, which moves the seat back into the pre-selected sitting position. At the end of this pivoting movement, the hook 53 of the lever 52, by its own and the spring 55 of the rocker 69, is guided back into its starting position in which it engages in the recess 54.

It has already been mentioned repeatedly that a loading spring 76 for the seat back is disposed inside the hollow cross member 17. The shape and form of this loading spring 76, as well as its arrangement and mounting in the cross member 17, are indicated in detail hereinafter.

A preferred form of the loading spring 76 is best seen in FIG. 9 of the appended drawings. This is a loading spring of circular cross-section which extends substantially rectilinearly, an inclined zone being however provided and the two ends being bent at an angle. The two bent ends are designated 78, 81 and cooperate with parts which are as yet to be mentioned. As can also be seen in FIG. 9, the one angled end 81 is followed by a portion 83 which—as already mentioned—extends at an incline in relation to the main part of the loading spring 76. As can best be seen in FIG. 3, this portion 83, in the normal position of the loading spring 76, does not bear against the inner wall of the cross member 17. Indeed, between it and the adjacent inside wall of the cross member 17 is left a gap which steadily increases towards the free end 81. This arrangement is contrived so as to permit disengagement of the loading spring 76 if required. If, namely, pressure is applied to the end face of the angled end 81, then the end 81 and also the portion 83 of the loading spring 76 can be raised, in fact sufficiently far for the end face of the angled end 81 to be, in its extreme position, inside the cross member 17. When this position is reached, then it becomes possible to withdraw the articulated amount (i.e. the hinge fitting) 12 in the axial direction of the cross member 17 and, with it, the loading spring 76.

When fitted, the angled end 81 of the loading spring 76 engages through a smooth bore 82 in the cross member 17. The aperture 82 is in the vicinity of the mount part 16 of the pivot bearing 14. The other, opposite, likewise angled end 78 of the loading spring 76, on the other hand, cooperates with the bearing pivot 43 of the hinge fitting or articulated mount 12. As can best be seen in FIG. 3 in the drawings, the bearing pivot 43 is a hollow journal in the embodiment illustrated. In the region of its free end, it exhibits two diametrically opposed slots 77 which accommodate the end 78 of the loading spring 76. The length of the angled end 78 of the loading spring 76 corresponds essentially to the diameter of the bearing pivot 43. By reason of this dimensioning, it is possible that portions of the loading spring 76 can still bear against the inner wall of the cross member 17, in fact both in the region of the end face of the angled end 78 and at the point of transition to the part of loading spring 76 between its ends. It must furthermore be remarked that the slots 77 are only so wide as to correspond approximately to the diameter of the loading spring 76. Thus, a transverse movement of the angled end 78 of the loading spring 76 in the region of the slots 77 is impossible. So that the angled end 78 of the loading spring 76 cannot be withdrawn from the forwardly open slots 77, a retaining means is also provided. In the embodiment illustrated, this consists of a disc 79 which engages zonewise in a circular groove, which will not be described in greater detail but which is provided in the vicinity of the free end of the bearing pivot 43, in fact on the inner wall thereof. The disc 79 is, in turn, secured in place by a flange 80 of the bearing pivot 43. By reason of the aforedescribed mounting of the end 78 of the loading spring 76, not only a non-rotary but also a nonretractable connection of the loading spring 76 to the bearing pivot 43 is achieved.

As a result of the selected mounting of the loading spring 76 in the region of the bearing pivot 43, the articulated mount 12 is at the same time secured against unintentional extraction of the cross member 17. If the indicated connection of the loading spring 76 to the bearing pivot 43 were not made, then it would normally be possible to extract the articulated mount 12 from the cross member 17 in an axial direction.

Attachment of the loading spring 76 in the region of the cross member 17 is very simple. During assembly, the angled end 78 is first engaged in the described manner in the slot 77 of the bearing pivot 43. Then, first the angled end 81, in other words the opposite, other end of the loading spring, is introduced into the aperture in the hollow cross member 17 and then pushed into the cavity sufficiently far for the angled end 81 to reach the area of the aperture 72 in the cross member 17. When the aperture 82 has been reached, then the spring force in the portion 83 of the loading spring 76 results in a transverse movement of the free end 81, so that, in the extreme position, the free end 81 assumes the position illustrated in FIG. 3. On the other hand, as already stated, a release of this connection between the loading spring 76 and the cross member 17 is also possible, when required.

Hitherto, no indication has been given in which direction the loading spring 76 acts on the back of a motor vehicle seat or the like. In order to explain this, reference is made to FIG. 5 of the appended drawings. When the parts of the motor vehicle seat assume the position shown in that drawing, then the loading spring 76 will act on the seat back in such a manner that the said back is pivoted into the climbing-in position. The loading spring 76 holds the back firmly in the climbing-in position until the back can be pivoted rearwardly by hand. The seat back returns to the preselected normal or sitting position.

Naturally, the loading spring 76 which is used also acts in the reclined position of the back. When the seat back is to be pivoted from the normal position rearwardly into the reclined position, then the parts of the seat, as is known, assume the position shown in FIG. 7. The user must pivot the seat back rearwardly by hand, against the action of the loading spring 76. On the other hand, the loading spring 76 is utilised so that the seat back can be moved from its reclined position automatically into the pre-selected normal position. So that the seat back can remain in its reclined position, i.e. does not return immediately when released, arresting elements known per se such as locks may be used. These are effective for as long as the user wishes to retain the reclined position of the seat back. If this is to be cancelled, then the lock or the like is moved into its open position, so that the loading spring 76 can take effect and move the seat back to its pre-selected normal position. As already mentioned, the embodiment illustrated is only an exemplary realisation of the invention, the latter not being confined thereto. Indeed, many other embodiments and applications are possible. In particular, the configuration and form of the loading spring 76 may differ from the embodiment. Also, this said spring may be mounted in a manner other than that illustrated. In contrast to the embodiment according to FIG. 9, the loading spring 76 may be a hairpin-shaped spring. The two free ends of such a hairpin spring may be angled and used to connect the spring to the cross member. On the other, opposite side, a transverse pin may be used to secure the spring. It is also possible to use a coiled spring. If necessary, one and the same cross member 17 may have a plurality of springs associated with it to load the seat back. Finally, as already mentioned, the biassing direction of the spring may be reversed. In contrast to the embodiment illustrated, a reversed arrangement of the spring 76 is possible, i.e. the angled end 78 would then cooperate with a pivot on the part 19, while the end 81 is engaged in the cross member 17 in the region of the adjusting and locking arrangement.

What is claimed is:

1. A seat, particularly a motor vehicle seat, comprising a seat portion; a seat back having a supporting frame comprising two spaced apart substantially upright members and a tubular cross member connecting said substantially upright members in the region of the lower ends thereof; pivot means coaxial with said tubular cross member for mounting the latter turnably about its axis so that said seat back may be turned relative to said seat portion between a substantially upright position and a plurality of rearwardly inclined positions, said pivot means comprising a hinge fitting on one side of said seat portion and including adjusting and releasable locking means for adjusting the position of said seat back relative to said seat portion and for locking said seat back in any adjusted position, and a simple pivot bearing on the other side of the seat portion; and a single loading spring in said tubular cross member and cooperating with the latter to bias the same in one direction to automatically turn said seat back in said one direction upon release of said locking means.

2. A seat as defined in claim 1, wherein said loading spring is connected at opposite ends to said hinge fitting and said cross member.

3. A seat as defined in claim 1 in which the loading spring is a torsion spring.

4. A seat as defined in claim 2, wherein said hinge fitting includes a pivot member to which one end of said loading spring is connected whereas the other end of the loading spring is releasably connected to said cross member so that said loading spring serves also to releasably connect said cross member and therewith said seat back to said pivot member of said hinge fitting.

5. A seat as defined in claim 4, wherein said hinge fitting and said pivot member thereof are removably connected to said one side of said seat portion so that upon disconnection of said hinge fitting and release of said other end of said loading spring said seat back may be easily removed from said seat portion.

6. A seat as defined in claim 4, wherein said one end of said loading spring is bent relative to the remainder of the spring and wherein said pivot member is provided with at least one slot transverse to its axis in which said one end of said spring is located, and including retaining means connected to said pivot member and engaging said one end of said spring to maintain the latter in said slot.

7. A seat as defined in claim 6, wherein said retaining means is a disc secured in position by flanges on said pivot member.

8. A seat as defined in claim 6, wherein the other end of said loading spring engages in an aperture of a wall portion of the tubular cross member.

9. A seat as defined in claim 8, wherein said loading spring extends with a major portion thereof parallel to the axis of the cross member and has in the region of the other end thereof a portion inclined to said axis and toward said wall portion of the cross member in which said aperture is formed.

10. A seat as defined in claim 9, wherein the part of the loading spring extending between said inclined portion and said one end is in contact with the inner surface of said tubular cross member.

References Cited

UNITED STATES PATENTS

| | | | |
|---|---|---|---|
| 2,784,770 | 3/1957 | Herr | 297—367 |
| 2,912,045 | 11/1959 | Milly | 297—363 |
| 3,044,830 | 7/1962 | Kolle | 297—361 |
| 3,051,526 | 8/1962 | Marner et al. | 297—367 |
| 3,099,485 | 7/1963 | Beierbech et al. | 297—373 |
| 3,156,004 | 11/1964 | Strien et al. | 297—367 X |
| 3,259,433 | 7/1966 | Warner | 297—367 |

FOREIGN PATENTS

| | | |
|---|---|---|
| 1,094,608 | 12/1960 | Germany. |
| 1,127,731 | 4/1962 | Germany. |

BOBBY R. GAY, *Primary Examiner.*

G. O. FINCH, *Assistant Examiner.*